United States Patent [19]

Funabashi et al.

[11] Patent Number: 5,481,061
[45] Date of Patent: Jan. 2, 1996

[54] METHOD FOR SOLIDIFYING RADIOACTIVE WASTE

[75] Inventors: Kiyomi Funabashi, Katsuta; Koichi Chino; Osamu Kuriyama, both of Hitachi; Tsutomu Baba, Katsuta; Shunsuke Uchida; Makoto Kikuchi, both of Hitachi, all of Japan

[73] Assignee: Hitachi, Ltd., Tokyo, Japan

[21] Appl. No.: 141,541

[22] Filed: Oct. 27, 1993

Related U.S. Application Data

[63] Continuation of Ser. No. 785,200, Nov. 1, 1991, abandoned, which is a continuation of Ser. No. 650,991, Feb. 4, 1991, abandoned, which is a continuation of Ser. No. 273,515, Nov. 4, 1988, abandoned.

[30] Foreign Application Priority Data

Mar. 13, 1987 [JP] Japan ................................. 62-56610

[51] Int. Cl.⁶ ........................................................ G21F 9/00
[52] U.S. Cl. ..................... 588/4; 588/3; 976/DIG. 395; 976/DIG. 384; 976/DIG. 385
[58] Field of Search ........................... 588/3, 4, 6, 255; 106/697, 724, 732, 735, 772, 792; 976/DIG. 395, DIG. 384, DIG. 385

[56] References Cited

U.S. PATENT DOCUMENTS

| | | | |
|---|---|---|---|
| 3,565,649 | 2/1971 | Stone et al. | 106/94 |
| 3,785,844 | 1/1974 | Kawano | 106/757 |
| 3,895,953 | 7/1975 | Mehta | 106/88 |
| 3,947,288 | 3/1976 | Kawano | 106/735 |
| 4,060,425 | 11/1977 | Harada et al. | 106/90 |
| 4,113,504 | 9/1978 | Chen | 106/97 |
| 4,122,028 | 10/1978 | Iffland et al. | 588/4 |
| 4,149,968 | 4/1979 | Kupiec et al. | 405/128 |
| 4,151,150 | 4/1979 | Peters et al. | 524/8 |
| 4,174,293 | 11/1979 | Colombo et al. | 252/628 |
| 4,240,952 | 12/1980 | Hurlbert, Jr. et al. | 106/103 |
| 4,249,949 | 2/1981 | Wooler et al. | 106/90 |
| 4,339,362 | 7/1982 | Pascau | 524/5 |
| 4,379,081 | 4/1983 | Rootham et al. | 252/628 |
| 4,416,810 | 11/1983 | Noakes | 252/628 |
| 4,424,148 | 1/1984 | Rosenstiel et al. | 252/628 |
| 4,436,850 | 3/1984 | Burdick et al. | 524/8 |
| 4,483,789 | 11/1984 | Kunze et al. | 252/628 |
| 4,504,317 | 3/1985 | Smeltzer et al. | 106/90 |
| 4,518,508 | 5/1985 | Conner | 210/751 |
| 4,530,723 | 7/1985 | Smeltzer et al. | 106/90 |
| 4,533,395 | 8/1985 | Vejmelka et al. | 106/89 |
| 4,537,918 | 8/1985 | Parcevaux et al. | 524/8 |
| 4,615,809 | 10/1986 | King | 106/90 |
| 4,620,947 | 11/1986 | Carlson | 252/628 |
| 4,671,897 | 6/1987 | Mori et al. | 252/628 |
| 4,704,415 | 11/1987 | Pierce et al. | 524/8 |
| 4,721,160 | 1/1988 | Parcevaux et al. | 524/8 |
| 4,732,705 | 3/1988 | Laske et al. | 588/4 |
| 4,775,495 | 10/1988 | Izumida et al. | 588/4 |
| 4,778,529 | 10/1988 | Barker et al. | 106/93 |
| 4,793,947 | 12/1988 | Izumida et al. | 588/4 |
| 4,800,042 | 1/1989 | Kurumada et al. | 588/4 |
| 4,828,761 | 5/1989 | Mattus et al. | 252/628 |

FOREIGN PATENT DOCUMENTS

| | | | |
|---|---|---|---|
| 51-67900 | 6/1976 | Japan | |
| 56-30697 | 3/1981 | Japan | |
| 57-92564 | 6/1982 | Japan | C04B 25/02 |
| 61-215999 | 9/1986 | Japan | |
| 61-245095 | 10/1986 | Japan | |

*Primary Examiner*—Ngoclan Mai
*Attorney, Agent, or Firm*—Antonelli, Terry, Stout & Kraus

[57] ABSTRACT

The present invention relates to a method of solidifying radioactive waste with cement, comprising forming a mixture comprising water, a hydrophilic material and cement substantially non-shrinkable or expansible with respect to volume change upon hardening, mixing said mixture with the radioactive waste, followed by hardening to form a solid body.

The present invention enables the formation of a compact solid body having voids, such as capillary voids, of reduced volume, which makes it possible to reduce the leaching rate of hazardous materials. Further, since no shrinkage accompanies hardening, no tensile stress occurs in the cement surrounding minute waste particles within the hardened material, thereby enabling a decrease in the strength of the solid body to be minimized. This in turn enables an increase in the amount of packing of waste. Prior addition of a hydrophilic material enables the cement fluidity before hardening to be maintained even after complete absorption of water by a water absorptive waste. This is extremely advantageous in carrying out hardening.

5 Claims, 3 Drawing Sheets

METHOD FOR SOLIDIFYING RADIOACTIVE WASTE

This application is a continuation of application of application Ser. No. 07/785,200, filed Nov. 1, 1991 which is a continuation of application Ser. No. 07/650,991, filed Feb. 4, 1991, which is a continuation of Ser. No. 07/273,515 filed Nov. 4, 1988, all are abandoned.

TECHNICAL FIELD

The present invention relates to a method of solidifying industrial wastes and solid bodies. More particularly, the present invention is concerned with a method of solidifying industrial wastes which comprises solidifying hazardous industrial wastes, such as a radioactive waste, with hydraulic materials, such as cement, so as to render them suitable for storage and solid bodies obtained thereby.

BACKGROUND ART

As is well known, it is necessary in order to ensure stable storage and disposal of industrial wastes, such as radioactive wastes, generated in radioactive substance handling facilities, such as a nuclear power plant, that such wastes should be solidified by packing them together with a solidifying material into a container, thereby preventing hazardous substances, such as radioactive substances, from diffusing into the environment.

Examples of the solidification method include one in which use is made of a solidifying material such as cement, asphalt, thermoplastics, thermosetting plastics, water glass, or the like. Although all of these solidifying materials are satisfactory from the viewpoint of attaining the object of preventing radioactive substances from diffusing into the environment, differences arise in the handling characteristics and the amount of packing of the waste according to the properties of each of them. Among these solidifying materials, cement has advantages that (1) it is an inorganic material and therefore exhibits high fire resistance, (2) it is hardenable at ordinary temperatures, and (3) it is generally used and therefore stable supply thereof is ensured. However, for the following reasons, the cement has a problem that there is a limitation to the amount of packing of the waste.

That is, a solidifying material comprising cement gives rise to voids as the result of shrinkage accompanying hardening. For details of this shrinkage of cement, reference may be made to A. M. Neville: "Properties of Concrete", 1977 published by Pitman Publishing Limited, (translation by Goto and Osaka published by Gihodo Publishing Co., Ltd. on Nov. 30, 1979). According to this literature, hardened cement consists of gel particles of hydrated cement, gel voids (gel pore) constituted of minute gaps formed among said gel particles, and capillary voids (capillary cavity) formed among agglomerates constituted of said gel particles and said gel voids. When water is mixed with cement at a water to cement ratio of 0.5, 60 ml of water and 40 ml of the cement are present in 100 ml of the resultant mixture. With the progress of hardening of the cement, however, the mixture comes to consist of 61.6 ml of hydrated cement gels, 24.0 ml of gel voids, and 14.4 ml of capillary voids. The gel voids are filled with water generally known as "gel water". Under normal conditions, there is no chance for this water to be removed. Consequently, only capillary voids remain as space and account for as much as 14% of the whole. When such voids are present, there occurs a problem that an increase in the amount of packing of the waste is accompanied by an increase in radioactivity leaching rate. Accordingly, known use of a cement solidifying material has had a drawback that the amount of packing of the waste cannot be increased because otherwise the radioactivity leaching rate will increase.

Examples of the radioactive wastes include those obtained in a boiling water reactor power plant (hereinafter referred to as "BWR plant") of which the major components are sodium sulfate and an ion exchange resin. All of these wastes exhibit water absorptivity. That is, sodium sulfate exhibits water absorptivity through formation of a hydrate and subsequent dissolution thereof. On the other hand, the ion exchange resin exhibits water absorptivity since it has hydrophilic ion exchange groups. When radioactive wastes are to be solidified with hydraulic materials, such as cement, the added water is absorbed by the water-absorptive radioactive wastes since they contain water-absorptive substances as described above. Further, when the amount of packing of the waste is large, the fluidity necessary for hardening the cement cannot be maintained, which makes solidification impossible.

In the above-described known cement solidification technique, no attention has been paid to two factors, i.e., capillary voids generated after hardening and viscosity increase of a water/cement mixture caused by water-absorptive radioactive wastes. Consequently, the known technique has had a drawback that the amount of packing of the waste cannot be increased.

Disclosure of Invention:

An object of the present invention is to provide a solidification method in which the radioactivity leaking rate of the wastes, e.g., radioactive wastes, incorporated in solid bodies can be decreased by reducing the volume of capillary voids even when the amount of packing of the waste is increased.

Another object of the present invention, in addition to the above, is to enable the water/cement mixture to keep its viscosity below a predetermined value even when the amount of packing of the waste is increased in solidifying water-absorptive wastes with a water/cement mixture.

The above-described objects of a method of solidifying industrial wastes with cement can be attained by mixing the industrial wastes with cement which is substantially non-shrinkable or expansible with respect to volume change upon hardening, and then hardening the cement, thereby forming solid bodies.

It is preferred that the cement be hardened after addition of a hydrophilic material to the cement.

The use of cement capable of generating expansible substances, such as ettringite, i.e., non-shrinkable or expansible cement for hardening, leads to formation of compact solid bodies having voids, such as capillary voids, of reduced volume, thereby enabling the radioactivity leaching rate to be decreased. Moreover, since no shrinkage accompanies hardening, no tensile stress occurs in the cement surrounding minute waste particles in the solid bodies, thereby enabling a reduction in the mechanic air, strengths (cracks etc.) of the solid bodies to be minimized. In addition, the capability of limiting the radioactivity leaking and the decrease in the mechanical strengths as described above enables the amount of packing of the waste to be increased.

Further, prior addition of a hydrophilic material enables the cement fluidity before hardening to be maintained even after complete absorption of water by water-absorptive

BEST MODE FOR CARRYING OUT THE INVENTION

Embodiments of the present invention will now be described with reference to the attached drawings.

Figure 1:
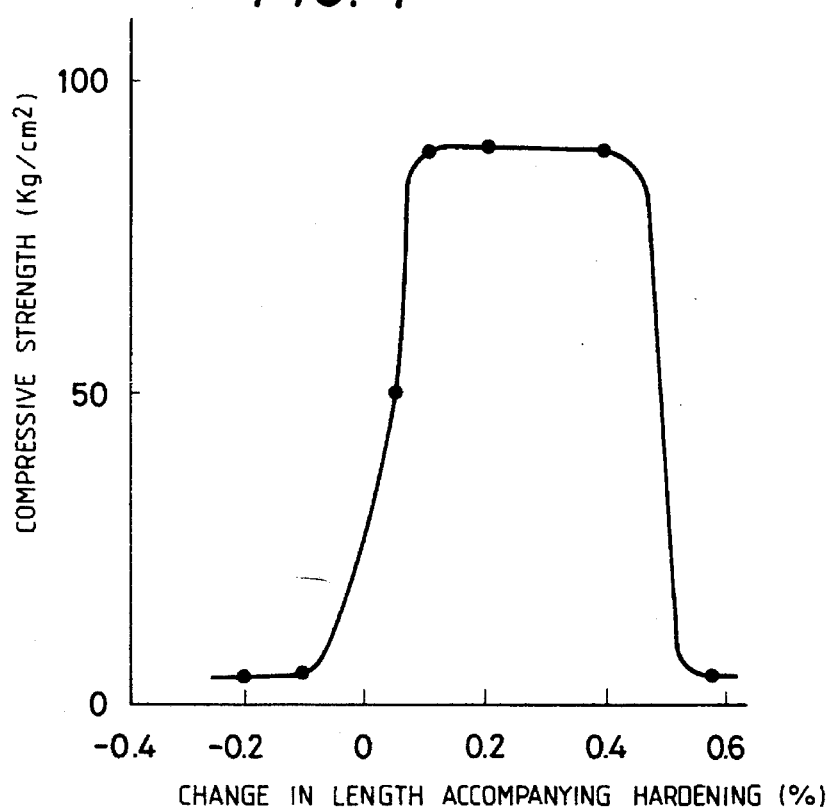
FIG. 1 is a graph showing the relationship between the cement expansibility and the mechanical strength in the present invention.

First, the volume change of cement accompanying hardening will be described. FIG. 1 shows the relationship between the length change accompanying hardening and the mechanical strength (compressive strength) of a cement-solidified body. Herein, various solid bodies were prepared by incorporating 20% by dry weight of an ion exchange resin into various cements exhibiting different volume changes upon hardening. The volume change upon hardening of cement was regulated primarily by regulating the formation of ettringite ($3CaO.Al_2O_3 \cdot 3CaSO_4 \cdot 32H_2O$). As a result, it Has been found that when the length change upon hardening (hardening and curing conditions: in the air at 35° C. for 14 days) is 0 to +0.5%, a high compressive strength can be attained. Moreover, the solid bodies were immersed in water for 30 days to measure the compressive strength. As a result, it has been found that they have maintained the strength before immersion. The reason for such a high water resistance is believed to reside in that not only the absence of any through capillary voids serves to inhibit the water absorption causative of a volume increase of the ion exchange resin, but also the cement has a sufficient strength to absorb any tensile stress occurring as a result of water absorption. Accordingly, a cement-solidified body having improved mechanical strength and water resistance can be attained by using cement whose length change upon hardening is 0 to +0.5.

The mechanism permitting the regulation of a length change upon hardening and the cement properties and an expanding agent for attaining the object of the present invention will now be described with reference to some particular examples.

Generally, in the hydration of cement, the true volumes of water and the cement after hardening are always smaller due to the hardening and shrinkage than those before hardening. Accordingly, from the microscopic viewpoint, it is not possible to avoid the occurrence of voids. However, it is possible to prevent the voids from communicating with one another, i.e., to inhibit the formation of through voids, i.e., to apparently, viz from the macroscopic viewpoint, inhibit shrinkage. What is provided in line with this thought is one designated as a "non-shrinkable or expansible cement". The expansible cement forms crystals having minute voids which do not mutually communicate. In the case of cement solidification of the above-described ion exchange resin, main crystals each comprise ettringite. However, in the case of calcium hydroxide or mixed system thereof as well, similar effects can be exerted. In order to form these crystals, it is necessary to add to cement in advance an expanding agent for promoting the formation of the crystals. In order to form ettringite, for example, a calcium solfoaluminate material whose major components are calcium sulfate and haünite ($3CaO \cdot 3Al_2O_3.CaSO_4$) may be used as an expanding agent. Moreover, in the case of calcium hydroxide, calcium oxide or a limy material containing the same may be used as an expanding agent.

Figure 2:
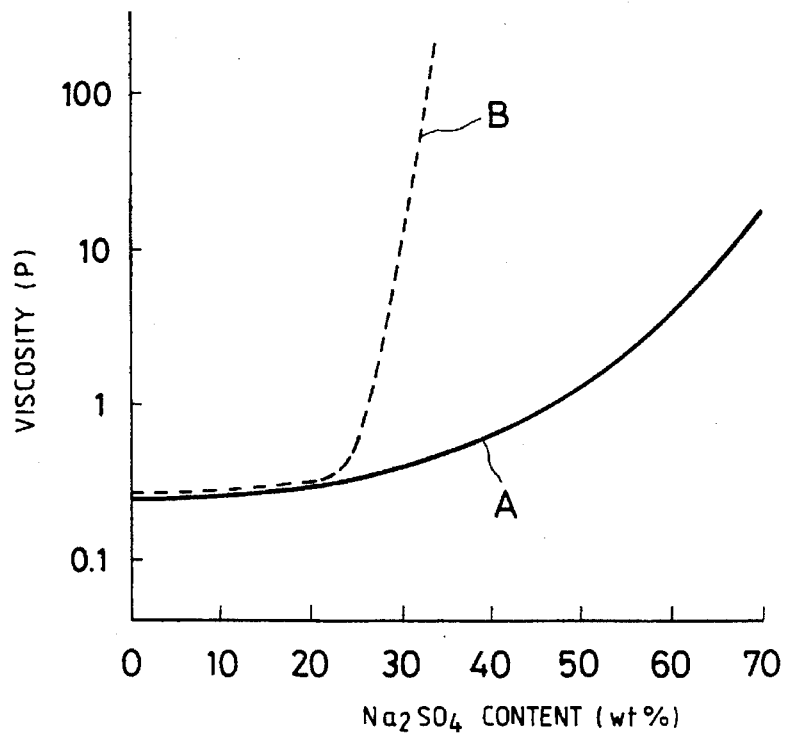
FIG. 2 is a graph showing the relationship between the viscosity of a cement/water mixture and the $Na_2SO_4$ content.

Subsequently, the effect of the water absorptivity of radioactive wastes on the fluidity of cement was investigated. FIG. 2 shows the results on the measurement of the viscosity of cement mixture against sodium sulfate contents. Herein, the water to cement ratio was set at 0.4. As a result, it has been found that when the $Na_2SO_4$ content reaches about 25% by weight, a rapid increase in the viscosity occurs. This is because $Na_2SO_4$ absorbs water present in the cement, thereby forming a hydrate of the formula $Na_2SO_4.10H_2O$ and, when $Na_2SO_4$ reaches 25% by weight, the stoichiometrical amount of water present in the cement is absorbed. Moreover, since the molecule of water is linked to $Na_2SO_4$ so weakly that it is lost by efflorescence under 10 conditions of a temperature of 20° C. and a relative humidity of 60% (believed to be average conditions within cement when allowed to stand at ordinary temperatures), it has been found that this water moves toward the cement with the progress of the hardening of the cement. Consequently, the addition of excess water is not an effective measure since there occur problems such as a decrease in the strength and difficulty in increasing the amount of packing of $Na_2SO_4$ as will be described later. Therefore, the present inventors have attempted to ensure predetermined fluidity for cement by adding a material miscible with water but not absorbed by $Na_2SO_4$. The present inventors have contemplated the use of a hydrophilic material as such a material and have added a polyalkylsulfonate hydrophilic material. The results are shown in FIG. 2. As shown by a solid line A, it has been found that when a hydrophilic material is added, predetermined fluidity can be maintained even when the water absorptive $Na_2SO_4$ content of the waste is increased. By contrast, as shown by a broken line B, it is apparent that when no hydrophilic material is added, the viscosity increases. Besides the above-described polyalkylsulfonate material, organic compounds having a hydrophilic group (hereinafter referred to as "organic compounds having a hydrophilic group"), such as a polyhydric alcohol or a salt of a polybasic carboxylic acid, may also be used as the hydrophilic material. Moreover, a polymer emulsion, such as a latex emulsion, may be used as the hydrophilic material. When this polymer emulsion (hereinafter referred to as a "hydrophilic polymer") is used, not only predetermined fluidity is ensured as in the case of the above-described hydrophilic material, but also the tackiness of the polymer can be utilized. This enables the bonding strength between minute hydrated cement particles to be enhanced, thereby exerting an effect of increasing the strengths, especially, tensile strength. Therefore, even when a large amount of water-absorptive radioactive waste is contained, predetermined fluidity of cement can be ensured by adding the hydrophilic material.

Figure 3:
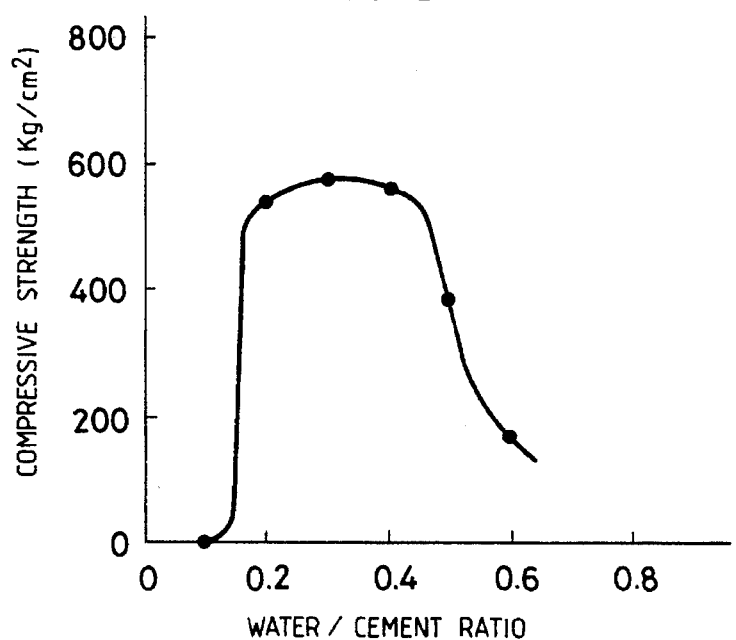
FIG. 3 is a graph showing the relationship between the water to cement ratio and the mechanical strength of solidified $Na_2SO_4$.
Figure 4:
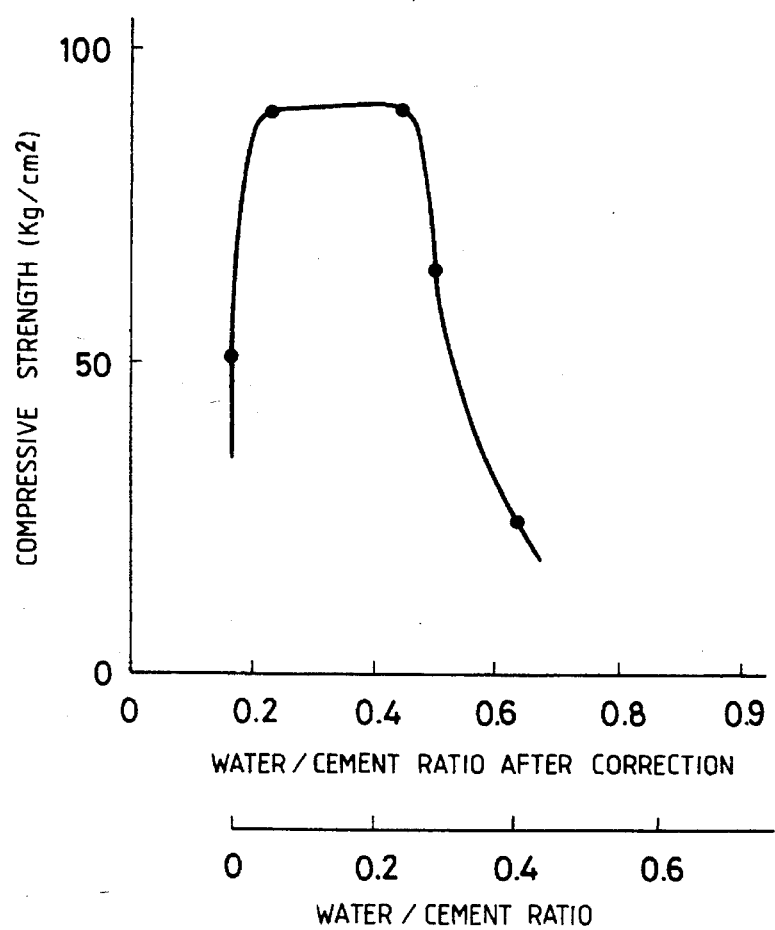
FIG. 4 is a graph showing the relationship between the water to cement ratio and the mechanical strength of solidified resin.

The results of an investigation on the amount of addition of water are shown in FIG. 3, which shows the results on the measurement of the mechanical strength at varied water to cement ratio when $Na_2SO_4$ was added in an amount of 30% by weight. Herein, as an expandable cement, 2% of a polysulfonate hydrophilic material was employed. As a result, it has been found that a solid body having high strength can be obtained when the water to cement ratio is 0.15 to 0.6, especially 0.15 to 0.45. This is because when the water to cement ratio is small, there is no sufficient amount of water for hydration of cement and when the water to cement ratio is large, excess water causes the number of voids to be increased. Moreover, similarly the results of the solidification conducted by incorporating an ion exchange resin in an amount of 20% by dry weight are shown in FIG. 4. In the solidification, an ion exchange resin (water content: 50%) from which the adherent water had been removed was used. The water content of the ion exchange resin is not included in the calculation. The solidification was conducted at varied water to cement ratios. Of the two axes of abscissae, the lower axis indicates the water to cement ratio wherein the water content of the ion exchange resin is not included in the calculation as described above. It is apparent from the results that the cement is hardened even when the water to cement ratio is 0. Then, the water content of the resin within the cement-solidified body was measured and was found to be identical with the equilibrium water content under conditions of a temperature of 20° C. and a relative humidity of 60%. Consequently, a corrected value was calculated assuming that water acted on the hydration of the cement in an amount equal to that desorbed from the 50% water-containing resin at a temperature of 20° C. and at a relative humidity of 60%. The upper axis of abscissa of FIG. 4 indicates the corrected values by designating them as the water to cement ratio after correction. It is apparent that when the water to cement ratio is 0.15 to 0.45, a solid body having a high mechanical strength can be obtained. This result is in agreement with that of cement solidification of sodium sulfate as shown in FIG. 3.

From the results of FIGS. 3 and 4, it is apparent that an acceptable cement-solidified body can be produced by determining the water to cement ratio between 0.15 and 0.45 on the assumption that the amount of adsorbed water at a temperature of 20° C. and at a relative humidity of 60% onto the waste packed into the solid body does not affect the effect of the cement.

Figure 5:
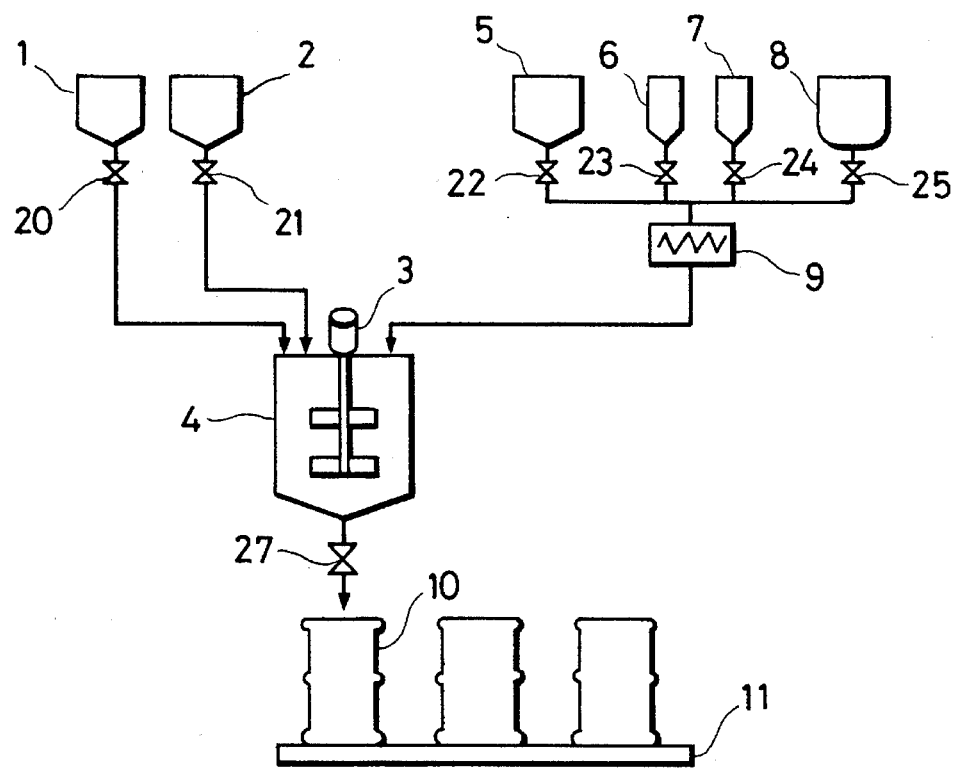
FIG. 5 is a schematic flow chart illustrating a cement solidification unit according to the present invention.

Detailed description will now be made with respect to a solidification unit used for carrying out the present invention. FIG. 5 shows a schematic view of such a solidification unit. In the figure, numeral 1 designates a tank for accommodating powdery sodium sulfate, numeral 2 a tank for accommodating an ion exchange resin (water content: 50%), numeral 3 an agitator, numeral 4 a kneading tank, numeral 5 a tank for accommodating cement, numeral 6 a tank for supplying an organic compound having a hydrophilic group, numeral 7 a tank for supplying a polymer emulsion, numeral 8 a tank for accommodating water, numeral 9 a cement mixer, numeral 10 a 200-l drum, numeral 11 a belt conveyor, and numerals 20 to 27 valves. The detail of solidification process will now be described in order of procedures. Sodium sulfate is a main component of a concentrated liquid waste and obtained by drying a concentrated liquid waste with a centrifugal thin-film dryer. When solidifying the powder of dried sodium sulfate, the powder is fed from the sodium sulfate powder tank 1 through the valve 20 into the kneading tank 4. A cement mixture serving as a solidifying agent is prepared by feeding to the cement mixer 9 cement from the cement tank 5 through the valve 22, an organic compound having a hydrophilic group from the supply tank 6 through the valve 23, a hydrophilic polymer from the tank 24 for supplying a polymer emulsion through the valve 24, and water from the water tank 8 through the valve 25, and mixing them with one another in, the mixer 9. In this case, the cement is one exhibiting a length change upon hardening as shown in FIG. 1, i.e., a coefficient of linear expansion of 0 to 0.5% and the water to cement mixing ratio is regulated to 0.15 to 0.45 as shown in FIG. 3. The cement mixture regulated so as to satisfy the above-described requirements is fed into the kneading tank 4 to be kneaded with the sodium sulfate powder by means of the agitator 4. The kneaded mixture is solidified after packed into the drum 10, which is transferred by the belt conveyor 11, through the valve 27.

On the other hand, when solidifying an ion exchange resin, the adherent water is preliminarily removed from the ion exchange resin with a centrifugal dryer or the like, and the ion exchange resin is then stored in the ion exchange tank 2 in such a state that the resin has a water content of about 50%. This resin may be fed through the valve 21 into the kneader 4 and solidified in the same manner as that described above with respect to sodium sulfate. However, in this case, the water to cement mixing ratio is regulated by making use of the amount of water desorbed from all of the ion exchange resins at a relative humidity of 70% so that the water to cement ratio afters correction as shown in FIG. 4 is 0.15 to 0.45.

Figure 6:
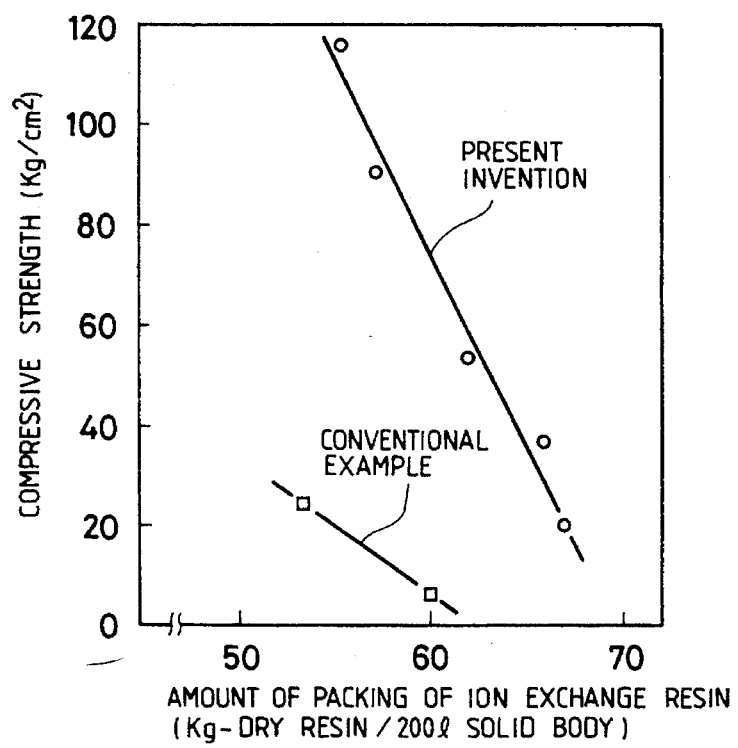
FIG. 6 is a graph showing the relationship between the amount of packing of an ion exchange resin and the mechanical strength.

An example with respect to the solidification of an ion exchange resin will now be described in more detail with reference to FIG. 6. FIG. 6 shows the relationship between the amount of packing of an ion exchange resin and the compressive strength. As can be seen from the figure, the cement solidification according to the present invention ensure an amount of packing of the ion exchange resin larger than that of the case of the conventional cement solidification. Comparison of the amounts of packing at a compressive strength of 20 kg/cm² shows that the amount of packing in the conventional cement solidification is 54 kg of dried resin per 200 l of the solid body while the amount of packing in the present invention is 66 kg of dried resin per 200 of the solid body. That is, the present invention enables an increase in the amount of packing by about 20%. Although the conventional cement solidification brings about a lowering in the strength during immersion when the amount of packing is large, the lowering in the strength in the present invention is very small. As with the above-described example, this example also enables the formation of a solid body having excellent water resistance and a large amount of packing of the waste.

In the above-described example, sodium sulfate is solidified in powder form. However, it is also possible to solidify sodium sulfate in solution form. In this case, since the concentration of the sodium sulfate solution can be increased at most up to 20 wt. %, the amount of packing of the waste cannot be increased.

Further, in the above-described examples, sodium sulfate and ion exchange resins are separately solidified. However, the same effect can be attained by solidifying them as a mixture.

Further, in the above-described examples, both the hydrophilic polymer and the organic compound having a hydrophilic group are used. They may also be used alone. The number of tanks used can be reduced when the hydrophilic polymer and the organic compound having a hydrophilic group can be preliminarily mixed with cement.

In the present invention, fibrous materials, such as carbon or glass fiber, may also be used for the purpose of enhancing the tensile strength.

Further, the use of cement capable of providing a solid body in which minute air bubbles are not connected to each other not only enables the formation of a light-weight solid body having excellent transportability but also makes the solid body less susceptible to lowering in the strength due to the floating of the waste in cement even when said waste has a low specific gravity.

Industrial Applicability:

The present invention enables the formation of solid bodies having high strength, which makes it possible to increase the amount of packing of the wastes into the solid bodies. Further, since the wastes can be formed into compact solid bodies, the water resistance of the solid bodies is high, which makes it possible to remarkably suppress the leaching rate of wastes, e.g., radioactive wastes, incorporated in the solid bodies. Therefore, the present invention is useful for solidification and storage of general industrial wastes containing heavy metals or other hazardous materials as well as radioactive wastes.

What is claimed is:

1. A method for solidifying a radioactive waste with cement as a main solidifying material to produce a solidified radioactive waste, comprising:

mixing water, a hydrophilic polymer emulsion and cement to form a first mixture, said cement having a coefficient of linear expansion of 0.1 to 0.5% with respect to volume change upon hardening and containing an expanding agent selected from the group consisting of calcium sulfate, calcium sulfoaluminate and calcium oxide;

adding radioactive waste to said first mixture and kneading the radioactive waste and first mixture to form a kneaded mixture, said radioactive waste being a water-absorptive; and packing the kneaded mixture into a solidifying container.

2. A method for solidifying a radioactive waste according to claim 1, wherein the step of mixing said water, said hydrophilic polymer emulsion and said cement to form said first mixture is accomplished in a first mixer and wherein the steps of adding the radioactive waste to said first mixture and kneading the radioactive waste and first mixture to form said kneaded mixture is accomplished in a second mixer.

3. A method for solidifying a radioactive waste according to claim 1, wherein a mixing ratio of water to cement is 0.15 to 0.45.

4. A method for solidifying a radioactive waste according to claim 1, wherein said hydrophilic polymer emulsion is latex emulsion.

5. A method for solidifying a radioactive waste according to claim 1, wherein said radioactive waste is a concentrated liquid radioactive waste containing sodium sulfate and i wherein said method further comprises drying the concentrated liquid radioactive waste to obtain dried sodium sulfate powder and remaining concentrated radioactive liquid waste, and wherein the dried sodium sulfate and the remaining concentrated liquid radioactive waste are separately added to said first mixture.

* * * * *